United States Patent [19]

Masri

[11] Patent Number: 4,961,860
[45] Date of Patent: Oct. 9, 1990

[54] METHOD OF WATER TREATMENT

[76] Inventor: Saad A. Masri, 36 Wildwood Road West, Lethbridge, Alberta, Canada, T6K 6C6

[21] Appl. No.: 325,431

[22] Filed: Mar. 20, 1989

[30] Foreign Application Priority Data

Nov. 23, 1988 [CA] Canada .................................. 583869

[51] Int. Cl.$^5$ ............................................. C02F 1/36
[52] U.S. Cl. ..................................... 210/748; 422/20
[58] Field of Search .................. 210/748, 900; 422/20, 422/128; 204/157.15

[56] References Cited

U.S. PATENT DOCUMENTS

| | | | |
|---|---|---|---|
| 3,537,655 | 11/1970 | Gustafson | 422/128 |
| 3,686,115 | 6/1970 | Farman et al. | 210/748 |
| 4,086,057 | 4/1978 | Everett | 210/748 |
| 4,211,744 | 7/1980 | Boucher | 422/20 |
| 4,308,229 | 12/1981 | Voit | 422/20 |
| 4,483,695 | 11/1984 | Covey, Jr. | 210/708 |
| 4,517,159 | 5/1985 | Karlson | 422/20 |

FOREIGN PATENT DOCUMENTS

809080 3/1969 Canada .................................. 267/44

Primary Examiner—Peter Hruskoci
Assistant Examiner—Krisanne Shideler
Attorney, Agent, or Firm—Michael Sand Co.

[57] ABSTRACT

A method of water treatment consisting of the step of diverting water through a fluid flow passage in which the water is subjected to ultrasonic vibrations in a range between 15 and 150 kilohertz for a period in excess of 12 seconds such that cavitation occurs.

7 Claims, 3 Drawing Sheets

METHOD OF WATER TREATMENT

The present invention relates to a method and apparatus for water treatment.

BACKGROUND OF THE INVENTION

At the present time chemicals are added to water which we drink or in which we bathe to kill harmful microorganisms. The extensive use of chemicals for water treatment is now being questioned as studies are made regarding possible harmful side effects resulting from long term usage.

SUMMARY OF THE INVENTION

What is required is a method of water treatment which will kill harmful microorganisms without the use of chemicals.

According to one aspect of the present invention there is provided a method of water treatment consisting the step of diverting water through a fluid flow passage in which the water is subjected to ultrasonic vibrations in a range between 15 and 150 kilohertz for a period in excess of 12 seconds such that cavitation occurs.

According to another aspect of the invention there is provided an apparatus for use in water treatment which is comprised of a container having a first end, a second end, side walls, an inlet and an outlet. The inlet is positioned in proximity to the first end of the container. The outlet is positioned in proximity to the second end of the container. An ultrasonic probe which emits a frequency in a range between 15 and 150 kilohertz is disposed in the container. The probe has a first end which extends through the first end of the container and a second end. The second end is disposed adjacent the inlet, such that water must flow past the probe in order to reach the outlet. A control valve is coupled to the inlet such that the flow rate of the water entering the inlet may be controlled.

According to another aspect of the invention, there is a method for treating water which is contained in a reservoir or holding tank. The method comprising the steps of, firstly, diverting the water to be treated into a holding tank. Secondly, subjecting the water in the holding tank to ultrasonic vibrations in a range between 15 and 150 kilohertz for a period in excess of 12 seconds thereby achieving cavitation.

Although beneficial results may be obtained through the use of the method described, with large holding tanks there is a danger that water remote from the probe will not be subject to sufficient vibrations for a sufficient time duration to achieve cavitation. Even more beneficial results may therefore be achieved by having ultrasonic probes mounted on one or more arms which rotate in the holding tank.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 2:
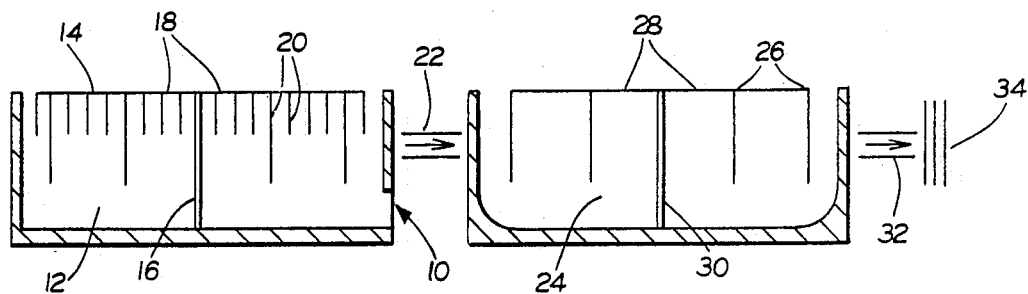
FIG. 2 is a flow chart illustrating the application of the method to residential water systems.
Figure 1:
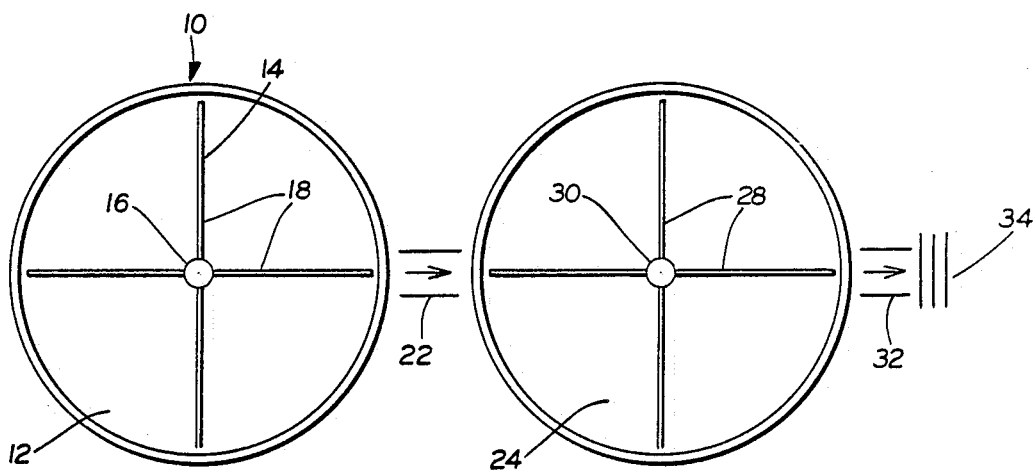
FIG. 1 is a flow chart illustrating the application of the method to swimming pools.

The preferred method will now be described with reference to two specific applications for which the method is suited as illustrated in FIGS. 1 and 2. The preferred embodiment of the apparatus adapted for use in accordance with the described method, generally designated by reference numeral 10, is an apparatus for use in water treatment which will be described with reference to FIG. 3. An alternate preferred embodiment which was developed for use in water reservoirs or holding tanks will be described with reference to FIGS. 4 and 5.

Figure 3:
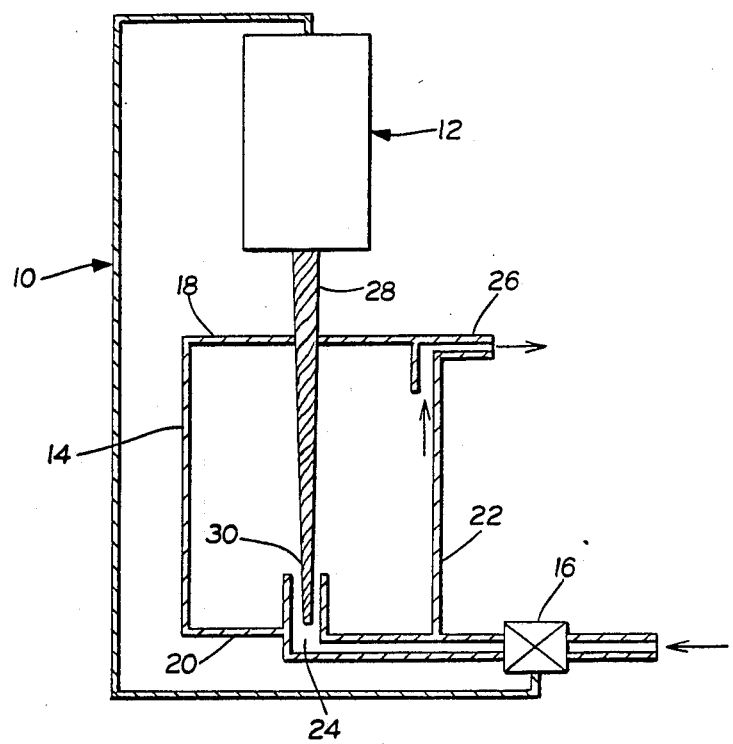
FIG. 3 is a section view of the apparatus taken along section lines 3—3 of FIGS. 1 and 2.

In the most fundamental form the method of water treatment advocated by the applicant involves a single step of diverting water through a fluid flow passage in which the water is subjected to ultrasonic vibrations in a range between 15 and 150 kilohertz for a period in excess of 12 seconds such that cavitation occurs. Cavitation is the formation followed by the rapid collapse of cavities in a liquid. Cavitation leads to the disruption of living cells, viral membranes and nucleic acids. Depending upon the duration this can reduce or neutralize microorganisms in a liquid or result in sterilization. Ultrasonic vibrations have previously been used in laboratory sterilization tanks, but to the best of the applicant's knowledge has never before been applied to a continuous flow water system. Present water treatment systems used by municipalities are not effective in killing some animal diseases (for example polio) and most plant diseases. The development of a continuous flow ultrasonic system by the applicant gives the homeowner a means of protecting the health of his family against contamination through the water supply. In future, apparatus will be developed which will permit ultrasonic vibrations to be emitted through the walls of a container or walls of a conduit forming a fluid flow passage. At present, the most feasible way of creating the ultrasonic vibrations is by means of an ultrasonic probe 12, as illustrated in FIG. 3 with respect to apparatus 10. It is generally known in the art that cavitation occurs in a frequency range of between 15 and 150 kilohertz. Probes which emit a frequency of 20 kilohertz are commercially available. The 20 kilohertz frequency is viewed as being the best to ensure long probe life, as prolonged use at that frequency does not damage the converter or the power source as is the case with other frequency levels. The applicant has determined that in order to achieve a desired reduction of microorganisms in the liquid, the liquid must be exposed to ultrasonic vibrations for in excess of 12 seconds. The preferred method, and more specifically the manner in which the water is kept exposed to ultrasonic vibrations for a period in excess of 12 seconds, will be further described with respect to the operation of apparatus 10.

Apparatus 10, as illustrated in FIG. 3, consists of three primary components an ultrasonic probe 12, a container 14 and a control valve 16. Container 14 has a first end 18, a second end 20, and side walls 22. An inlet 24 is provided at second end 20 of container 14. An outlet 26 is provided at first end 18 of container 14. Probe 12 has a first end 28 which extends through the first end 18 of container 14 and a second end 30 which is adjacent second end 20 of container 14 and extends into inlet 24. Control valve 16 is positioned in a fluid flow passage 34 which is connected to inlet 24.

The method and the use of apparatus 10 will now be described with reference to FIGS. 1 through 3. FIG. 1 illustrates a flow diagram regarding the placement of apparatus 10 in order to reduce the levels of microorganisms in a swimming pool 36. Water is circulated from swimming pool 36 via a conduit 38 through a filter 40. Water then is circulated from filter 40 via fluid flow passage 34 to inlet 24 of apparatus 10. Water then flows from outlet 26 via a conduit 42 back to swimming pool 36.

FIG. 2 illustrates a flow diagram regarding the placement of apparatus 10 in order to reduce the levels of microorganisms in the water supply entering a residence 44 from a municipal water main 46. Water flows from municipal water main 46 into the residence via fluid flow passage 34. Water flows via fluid flow passage 34 to inlet 24 of apparatus 10. Water from outlet 26 is connected by interior residential water lines 48 to the interior water taps 50.

Referring to FIG. 3, in both of the water treatment systems illustrated in FIGS. 1 and 2 water flows through apparatus 10. As water enters inlet 24 it is immediately subject to ultrasonic vibrations of a frequency of 20 kilohertz from probe 12. As the water flows through container 14 it continues to be subjected to ultrasonic vibrations from probe 12 until it flows out of outlet 26. The rate at which water flows through container 14 is controlled by adjustment of control valve 16 so that water takes 12 seconds to flow between inlet 24 and outlet 26. The flow of water can be continuous for a circulating system such as is illustrated in FIG. 1, or it can be intermittent where water is only drawn upon as required for use as is illustrated in FIG. 2. The capacity of apparatus 10 is dependent upon the size of container 14. The size of container 14 is selected by virtue of the volume of water which it is desired to pass through the system in a 12 second interval. Container 14 will never have to be a large tank, as a succession of 12 second intervals can translate into a tremendous volume of water over a longer time interval. Container 14 can be merely a length of conduit if the water volume produced in a 12 second interval through the conduit would be sufficient for the intended purpose. As a general rule, the greater the diameter of probe 12, the greater will be the range and strength of the ultrasonic vibrations produced. The diameter of probe 12 selected, assuming a 20 kilohertz frequency, will depend upon desired flow rate and the size of container 14. By way of example, during tests conducted in a laboratory by the applicant with a continuous flow chamber the capacity of a probe with a 3.2 millimeter circumference was tested as 7 liters per minute for killing most microorganisms and 2 liters per minute for spore forming bacteria. When the probe circumference was 19 millimeters, the capacity of the probe was tested as 200 liters per minute for killing most microorganisms and 75 liters per minute for spore forming bacteria.

Figure 5:
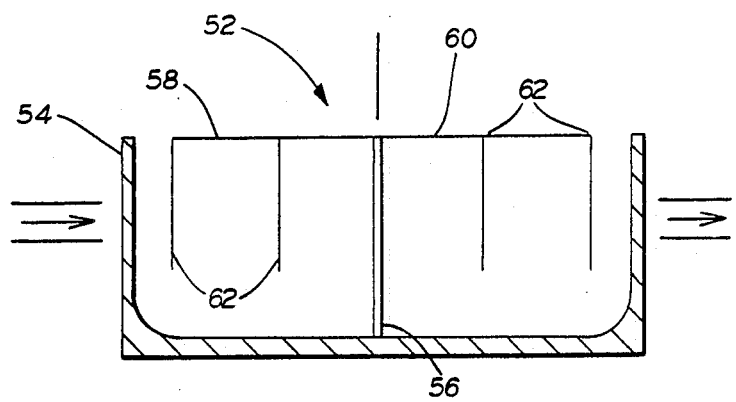
FIG. 5 is a section view taken along section lines 5—5 of the alternate form of apparatus illustrated in FIG. 4.
Figure 4:
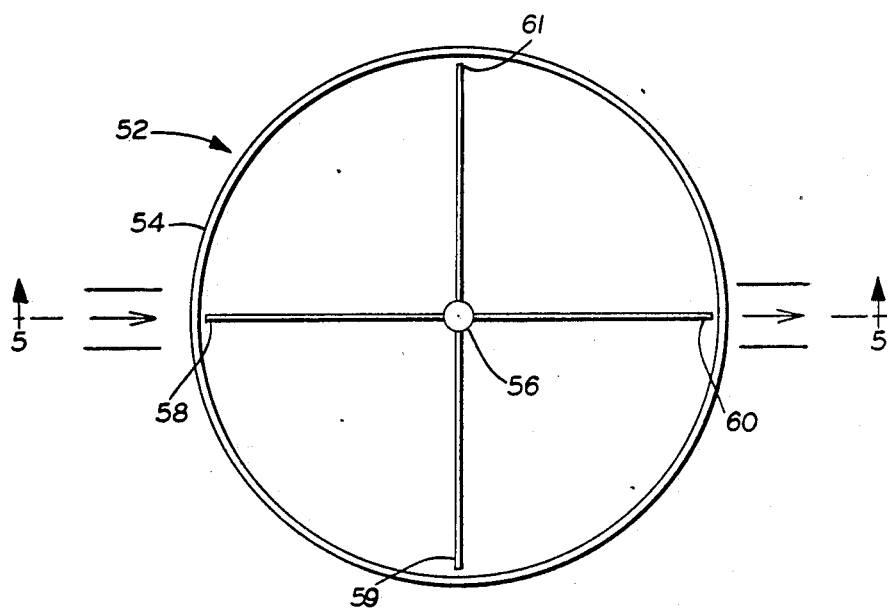
FIG. 4 is a top plan view of an alternate form of apparatus.

Referring now to FIGS. 4 and 5, there is illustrated an apparatus 52 for use in water treatment which was developed for use in water reservoirs or holding tanks. This apparatus is used when it is not practical to flow water past an ultrasonic probe. In most municipal and rural applications some form of reservoir or holding tank is used. It is not practical to circulate the water in such large reservoirs or holding tanks. Apparatus 52 consists of a holding tank 54. A shaft 56 is journalled for rotation in holding tank 54. Shaft 56 would normally be secured to a motor (not shown). Four arms 58, 59, 60 and 61 are secured to shaft 56. Two ultrasonic probes 62 are mounted on each of arms 58, 59, 60 and 61.

The method of use of apparatus 52 will now be described with reference to FIGS. 4 and 5. The method consists of the steps of, firstly, diverting water to be treated into holding tank 52. Secondly, subjecting water in holding tank 52 to ultrasonic vibrations from ultrasonic probes 62 mounted on arms 58, 59, 60 and 61. Upon rotation of shaft 54 ultrasonic probes 62 circulate in holding tank 52. Ultrasonic probes 62 emit vibrations in a range between 15 and 150 kilohertz. Cavitation occurs killing bacteria in the water if vibrations in a range between 15 and 150 kilohertz are sustained in proximity to the bacteria for a period in excess of 12 seconds. The circulation of ultrasonic probes 62 in holding tank 52 ensures that all water in holding tank 52 is subjected to vibrations for the necessary time period.

It will be apparent to one skilled in the art that the present method and apparatus are superior to existing water treatment systems used for continuous water flow. It will also be apparent to one skilled in the art that modifications may be made to the preferred embodiment of the apparatus without departing from the spirit and scope of the invention. In particular, ultrasonic vibrations may be produced through the walls of container 14 instead of using probe 12. As well, container 14 can merely consist of an extension of fluid flow passage 34 if the flow rate is kept low enough. Where there is a large reservoir of water, rather than create movement of the water in relation to a fixed probe, the same result may be achieved by moving the ultrasonic probes in relation to the body of water.

The embodiments of the invention in which an exclusive property or privilege is claimed are defined as follows:

1. A method of treating water to kill harmful microorganisms contained therein, comprising the steps of:
   a. firstly, diverting the water to be treated into a holding tank;
   b. secondly, subjecting the water in the holding tank to ultrasonic vibrations in a range between 15 and 150 kilohertz for a period in excess of 12 seconds by a plurality of ultrasonic probes mounted on one or more arms which rotate in the holding tank thereby achieving cavitation and killing the harmful microorganisms.

2. The method defined in claim 1 wherein the probes are disposed longitudinally in the holding tank.

3. The method defined in claim 1 wherein the tank has an inlet and an outlet providing a fluid flow passage through the tank.

4. The method defined in claim 3 wherein the tank has a first end, a second end, and side walls, the inlet being in proximity to the second end of the container, and the outlet being in proximity to the first end of the container.

5. The method defined in claim 4 wherein the ultrasonic probes move through the first end of the container and past the inlet, such that the water must flow past the probes in order to reach the outlet.

6. The method defined in claim 4 wherein valve means control the flow rate of the water through the fluid flow passage.

7. A method of treating water to kill harmful microorganisms contained therein, comprising the steps of:

a. firstly, diverting the water to be treated into a holding tank;
b. secondly, subjecting the water in the holding tank to ultrasonic vibrations from a plurality of ultrasonic probes mounted on two arms which rotate in the holding tank, the vibrations being in a range between 15 and 150 kilohertz for a period in excess of 12 seconds thereby achieving cavitation and killing the harmful microorganisms.

* * * * *